May 19, 1959 T. C. STANLEY 2,886,913
FISHING LURE
Filed June 6, 1956
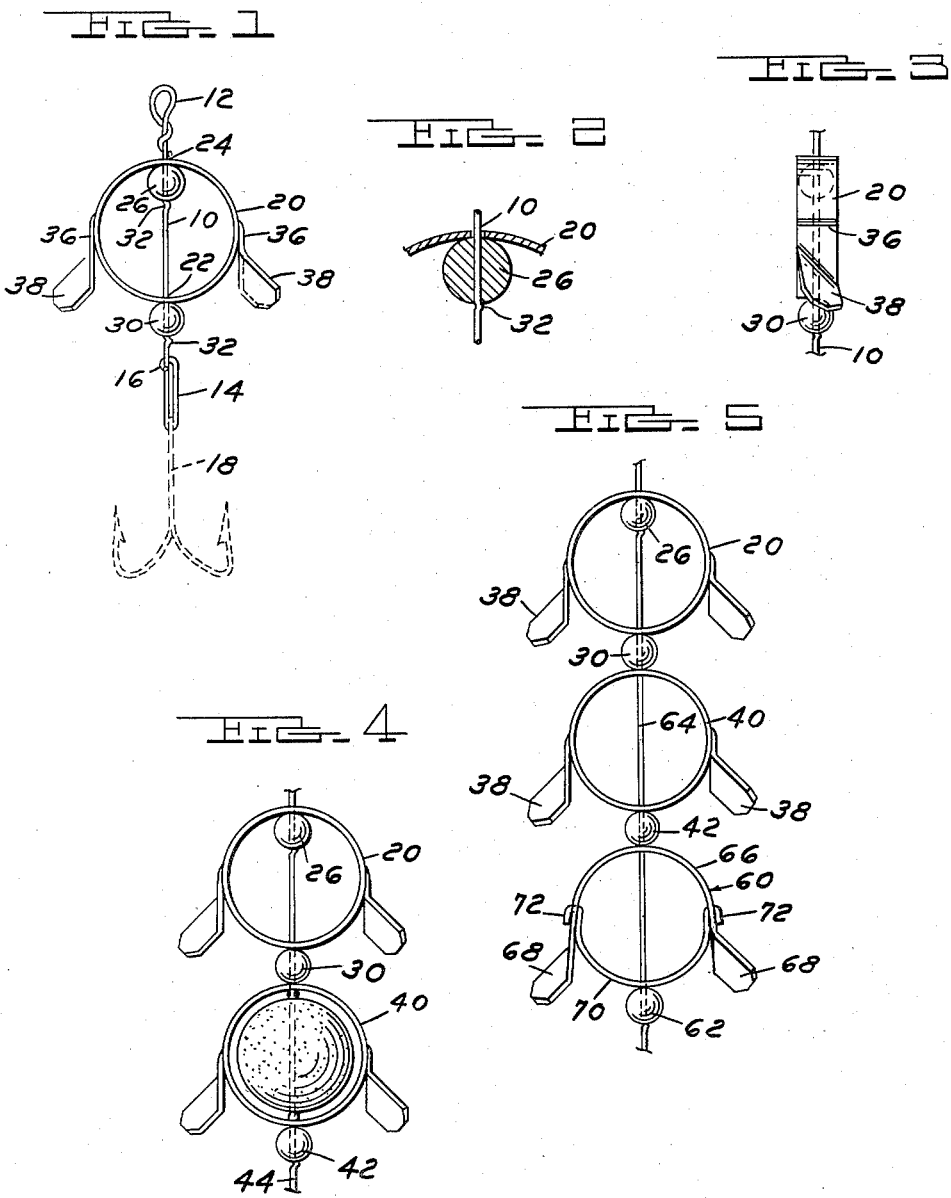
INVENTOR.
THOMAS C. STANLEY
BY
ATTORNEYS

United States Patent Office 2,886,913
Patented May 19, 1959

2,886,913

FISHING LURE

Thomas C. Stanley, Monroe, Mich.

Application June 6, 1956, Serial No. 589,644

7 Claims. (Cl. 43—42.19)

This invention relates to a fishing lure.

It is an object of the present invention to provide an extremely economical and effective fishing lure of the spinning type utilizing a novel construction.

It is an object of the present invention to provide a spinning device which can be formed of rings of material, the wings being fastened to the ring and so disposed that the resistance to twisting in the water is extremely low. The ring also provides a sufficient surface to apply colors if desired and lends itself to a double bearing arrangement in the construction.

Drawings accompany the disclosure, and the various views thereof may be briefly described as:

Figure 1, a plan view of the assembly.

Figure 2, a small sectional view illustrating the bearing arrangement.

Figure 3, a side elevation of the winged portion of the spinner unit.

Figures 4 and 5, illustrations of double and triple tandem spinners utilizing the identical construction of the single unit.

Referring to the drawings, the construction consists of a main shank 10 having a leader loop 12 and a safety releasable type of elongate loop 14 at the other end. The loop 14 may be unhooked at 16 to permit a connection thereto of a hook 18, either single, double or triple, as desired. On the shank 10 is a ring 20 which can have any size desired. One convenient size is a ring from ¾" to 1" diameter and about ¼" in axial dimension.

The shaft 10 passes through the walls of the ring at diametrically opposed points 22 and 24. The holes in the walls of the ring are of sufficient size that the ring spins freely on the shaft. Bearings are provided in the form of balls 26 and 30, which are held in position by slight offsets 32 in the shaft (see Figure 2).

The ring can be economically formed by simply cutting off tubing at spaced intervals, and the wings on the ring are formed of sheet metal having a portion 36 spot welded or otherwise fastened to the ring on opposite sides. Wing portions 38 extend outwardly and are bent in a manner that each will propel the ring in the same direction as it is moved through the water.

In Figure 4 a double unit is shown having the same elements with a second ring 40 and another ball 42 on a longer shaft 44. In Figure 5 a triple unit is shown having rings 20, 40 and 60 and an additional ball bearing 62 on a shaft 64.

In one of the units of Figure 5, I have shown a modified construction wherein the ring 60 is formed of two halves, one half 66 forming the forward portion with wings 68 projecting rearwardly. The rear half 70 has ears 72 projecting outwardly through holes in the portion 66 to complete the ring. Plastic or sheet metal may be used for all modifications, it being possible to mold and weld this material.

The device is such that when the ring is spinning, the balls within the ring are visible; and the spinning ring creates the illusion of a solid body much in the form of a fish. The bait has been found to be quite effective in actual use and provides an attractive lure. The rings may be painted inside and out or with varying colors if desired, or they may be finished bright with a plating operation.

This device may be mounted on gut and assembled in the form of a device to use with live bait (i.e., worms, minnows, frogs, etc.). Also, it can be mounted on 4' to 6' wire at 12" to 24" intervals to form lake trout and musky trolling rig. As shown at Figure 4, a cork, balsa or plastic ball can be mounted in the center of one or more of the rings to make a floating lure of this device.

I claim:

1. A fishing lure comprising a hollow cylindrical wall defining a ring, said cylindrical wall having a substantially uniform width measured axially and a substantially uniform thickness measured radially, said width being several times said thickness, a shaft passing through diametrically opposed points on said cylindrical wall, thereby rotatably mounting said ring on said shaft, bearing means on said shaft for positioning said ring, and flared wings mounted diametrically opposite each other on the outer surface of said ring for imparting a revolving motion to said ring when said shaft is moved axially through a fluid.

2. The fishing lure set forth in claim 1 wherein said flared wings are positioned at points on said ring at substantially 90° from said points on said ring through which said shaft passes.

3. The fishing lure set forth in claim 1 wherein the flared wings are of substantially uniform width equal to the width of said cylindrical wall measured axially and lie entirely on one side of a line at right angles to the axis of said shaft.

4. A fishing lure comprising a hollow cylindrical wall defining a ring, said cylindrical wall having a substantially uniform width measured axially and a substantially uniform thickness measured radially, said width being several times said thickness, a shaft passing through diametrically opposed points on said cylindrical wall, thereby rotatably mounting said ring on said shaft, a first ball rotatably mounted on said shaft adjacent the interior surface of said cylindrical wall, a second ball rotatably mounted on said shaft adjacent the exterior surface of said cylindrical wall at a point diametrically opposite said first ball, means on said shaft individual to each said ball for preventing axial movement of each said ball away from its respective surface thereby forming bearings for rotatably mounting said ring, and flared wings mounted diametrically opposite each other on the outer surface of said ring for imparting a revolving motion to said ring when said shaft is moved axially through a fluid.

5. The fishing lure set forth in claim 4 wherein said means for preventing axial movement of each said ball comprises an offset on said shaft.

6. The fishing lure set forth in claim 4 including a second cylindrical wall defining a second ring rotatably mounted on said shaft, flared wings mounted at diametrically opposed points on the outer surface of said ring for imparting a revolving motion to said ring when said shaft is moved axially through a fluid, the outer surface of said second cylindrical wall being adjacent said ball which is adjacent the outer surface of said first ring, a third ball on said shaft adjacent the outer surface of said second cylindrical wall at a point diametrically opposite said second ball, and means for preventing axial movement of said third ball away from said second ring on said shaft.

7. A fishing lure comprising a hollow ring formed of two sections, each said section having a substantially uniform width and a substantially uniform thickness, one said section having a central U-shaped portion with flared wings at the ends of said U-shaped portion, the other said section being semicircular and having means on the ends thereof for engaging the extremities of said U-shaped portion of said one section thereby forming said ring, a shaft passing through diametrically opposed points on said ring corresponding to the centers of each said section, said wings being shaped to impart a rotary motion to said ring as the shaft is moved axially through a fluid, the dimensions of each said section being such that the width of said ring measured axially is several times the thickness of said ring measured radially.

References Cited in the file of this patent

UNITED STATES PATENTS

| | | |
|---|---|---|
| 784,398 | Heckler | Mar. 7, 1905 |
| 923,854 | Kenyon | June 8, 1909 |
| 1,522,019 | Mantz | Jan. 6, 1925 |
| 1,584,100 | Koepke | May 11, 1926 |
| 1,620,972 | Hobbs | Mar. 15, 1927 |

FOREIGN PATENTS

| | | |
|---|---|---|
| 904,708 | France | Nov. 14, 1945 |